(12) United States Patent
Parrot

(10) Patent No.: US 12,151,902 B2
(45) Date of Patent: Nov. 26, 2024

(54) SYSTEMS AND METHODS FOR ORIENTING PACKAGES

(71) Applicant: WESTROCK PACKAGING SYSTEMS, LLC, Atlanta, GA (US)

(72) Inventor: Eric L. Parrot, Segry (FR)

(73) Assignee: WestRock Packaging Systems, LLC, Atlanta, GA (US)

( * ) Notice: Subject to any disclaimer, the term of this patent is extended or adjusted under 35 U.S.C. 154(b) by 19 days.

(21) Appl. No.: 17/909,388

(22) PCT Filed: Mar. 4, 2021

(86) PCT No.: PCT/US2021/020913
§ 371 (c)(1),
(2) Date: Sep. 4, 2022

(87) PCT Pub. No.: WO2021/178694
PCT Pub. Date: Sep. 10, 2021

(65) Prior Publication Data
US 2023/0097636 A1  Mar. 30, 2023

Related U.S. Application Data

(60) Provisional application No. 62/985,013, filed on Mar. 4, 2020.

(51) Int. Cl.
*B65G 47/28* (2006.01)
*B65G 47/08* (2006.01)
(Continued)

(52) U.S. Cl.
CPC ........... *B65G 47/28* (2013.01); *B65G 47/086* (2013.01); *B65G 47/244* (2013.01);
(Continued)

(58) Field of Classification Search
CPC ................. B65G 47/086; B65G 2201/025; B65G 47/28; B65G 47/841; B65G 47/244;
(Continued)

(56) References Cited

U.S. PATENT DOCUMENTS 8,322,514 B2 * 12/2012 Bonnain ............... B65G 47/71
  198/470.1
9,403,611 B2 * 8/2016 Sacchetti ............. B65G 47/842
(Continued)

FOREIGN PATENT DOCUMENTS

| DE | 4125342 A1 * | 2/1993 | .......... B65G 47/244 |
| DE | 102012210329 A1 * | 12/2013 | ............. B65B 35/24 |
| DE | 102013105175 A1 * | 11/2014 | .......... B65B 35/405 |
| DE | 102015224874 A1 * | 6/2017 | |
| EP | 1052200 A1 * | 11/2000 | .......... B65B 35/405 |
| FR | 3075188 A1 * | 6/2019 | |
| GB | 2185954 A * | 8/1987 | .......... B65G 47/244 |
| WO | WO-2018167437 A1 * | 9/2018 | .......... B65G 47/088 |

OTHER PUBLICATIONS

International Search Report issued in corresponding PCT Application No. PCT/US2021/020913 on Jul. 14, 2021.

*Primary Examiner* — Gene O Crawford
*Assistant Examiner* — Muhammad Awais
(74) *Attorney, Agent, or Firm* — Brian J. Goldberg; Rohini K. Garg

(57) ABSTRACT

A system for grouping and rotating packages (101) includes a first conveyor (102) configured to drive a stream of packages from a first end (102A) to a second end (102B) at a predefined first speed, an actuation section (104) situated at the second end (102B) of the first conveyor (102) configured to receive the stream of packages from the first conveyor (102) and actuate the stream of packages to an orienting section (108) at a predefined second speed, wherein the second speed is less than the first speed, and a plurality of lugs (106) adjacent to the actuation section (104) configured to actuate forward packages in the stream of packages forming groups (105) of two or more packages (101).

16 Claims, 4 Drawing Sheets

(51) Int. Cl.
*B65G 47/244* (2006.01)
*B65G 47/26* (2006.01)
*B65G 47/84* (2006.01)

(52) U.S. Cl.
CPC ......... *B65G 47/261* (2013.01); *B65G 47/841* (2013.01); *B65G 2201/025* (2013.01)

(58) Field of Classification Search
CPC .. B65G 47/261; B65G 47/082; B65G 47/084; B65G 47/31; B65G 47/32; B65G 47/71; B65B 35/00; B65B 35/30; B65B 35/44
USPC ......................................................... 198/375
See application file for complete search history.

(56) References Cited

U.S. PATENT DOCUMENTS

| | | | | |
|---|---|---|---|---|
| 9,487,315 | B2* | 11/2016 | Poutot | B65B 5/024 |
| 9,663,305 | B2* | 5/2017 | Papsdorf | B65G 54/02 |
| 10,086,961 | B2* | 10/2018 | Bonnain | B65B 21/183 |
| 2011/0030311 | A1* | 2/2011 | Martini | B65B 43/185 |
| | | | | 53/154 |
| 2014/0262685 | A1* | 9/2014 | Job | B65G 47/29 |
| | | | | 198/419.1 |

\* cited by examiner

SYSTEMS AND METHODS FOR ORIENTING PACKAGES

CROSS REFERENCE TO RELATED APPLICATION

This application claims the benefit of U.S. Provisional Patent Application No. 62/985,013 filed Mar. 4, 2020, the disclosure of which is herein incorporated by reference in its entirety.

BACKGROUND

The present disclosure relates particularly, but not exclusively, to the field of machinery for grouping articles prior to their being oriented, and more particularly, though not exclusively, to the field of machinery that comprise tools, each of which are driven independently around a fixed track by an independent drive means.

DESCRIPTION OF RELATED ART

In the packaging industry, it is commonplace to require articles within a stream to be oriented and reoriented prior to them being packaged or labeled. It is further commonplace to require the items to be spaced from one another by a predetermined amount so as to coincide with, for example, the spacing of those corresponding packages. Various solutions to these requirements are known in the art and regularly require positioning each item or package individually.

However, the aforementioned systems typically require a central drive means and also require a great amount of turning mechanisms. These common design characteristics lead to relatively high stresses on the drive means and corresponding mechanical linkages, especially at high through-put rates, and reduces the versatility of the system as a whole. One possible solution, is the provision of multiple drive chains, to each of which is attached a selection of tools; each drive chain being controlled in concert with one another so as to provide an overall drive system. However, this solution results in a system that is overly complex, since it requires the provision of numerous drive chains that must be carefully aligned to work at high speed. Furthermore, unless a drive chain is provided for each tool, of which there are usually a substantial number, this solution still suffers from the problem of each tool being mechanically linked to at least one other tool and it therefore being impossible to control each tool entirely independently.

A further problem of the prior art relates to the provision, and subsequent maintenance of chains and belts upon which the tools are mounted. Chains are required to be both strong and flexible, and suffer from wear through continual high speed use. A need therefore exists for driving and turning systems that do not require belts or chains that are required to rotate at high speeds.

The present invention therefore seeks to overcome or at least to mitigate the problems of the prior art relating to the provision of a system whereby each tool may be controlled independently of each other tool and which system may be achieved without undue complexity and cost, and suffer from reduced maintenance requirements.

The technical advantages of such a system will become apparent in the following description but, briefly stated, relate to an increase in the through-put rate of the system, an increase in the flexibility of the system, and the possibility of adapting to a variable article and/or carton requirements whilst the overall system maintains continuous use.

SUMMARY OF THE INVENTION

A system for grouping packages including a first conveyor configured to drive a stream of packages from a first end to a second end at a predefined first speed, an actuation section situated at the second end of the first conveyor configured to receive the stream of packages from the first conveyor and actuate the stream of packages to an orienting section at a predefined second speed, wherein the second speed is less than the first speed, and a plurality of lugs adjacent to the actuation section configured to actuate forward packages in the stream of packages forming groups of two or more packages. The plurality of lugs are each mounted upon, and may follow a path of a single fixed track and may be individually controllable such that at least one of the lugs serves to increase the speed of the packages while actuating the package whilst one or more other lugs travels at a different speed. Each of the lugs may pass over the actuation section. The track is configured to drive each of the lugs to contact the packages prior to the orienting section and configured to drive each of the lugs away from the packages within the orienting section. Each of the lugs may be configured to actuate every other or every third package of the stream of packages.

An orienting section may be located downstream of the actuation section and include a plurality of chain driven rotator mechanisms configured to rotate the groups of packages. The rotator mechanisms may rotate the groups of packages by approximately 90 degrees.

A second conveyor section may be placed downstream of the orienting section. A splitting section may be downstream of the second conveyor.

A method of turning groups of packages includes driving a stream of packages by a first conveyor wherein each of the packages are spaced apart from each other, forming groups of packages by driving one or more packages of the stream of packages at a different speed than the first conveyor, the groups of packages being spaced apart from each other, and rotating the groups of packages by approximately 90 degrees in order to prepare the groups of packages for subsequent packaging processes. Every second or every third (or other predetermined number) package of the stream of packages may be driven by a lug during the group forming step.

Each of packages of the stream of packages downstream of the first conveyor may be slowed down with respect to the first conveyor. Subsequent packaging processes may include driving each of the groups of packages by a second conveyor and splitting each of the previously formed groups of packages into individual streams of packages or a stream of individual packages.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail below with reference to certain figures, wherein.

DETAILED DESCRIPTION

Figure 1:
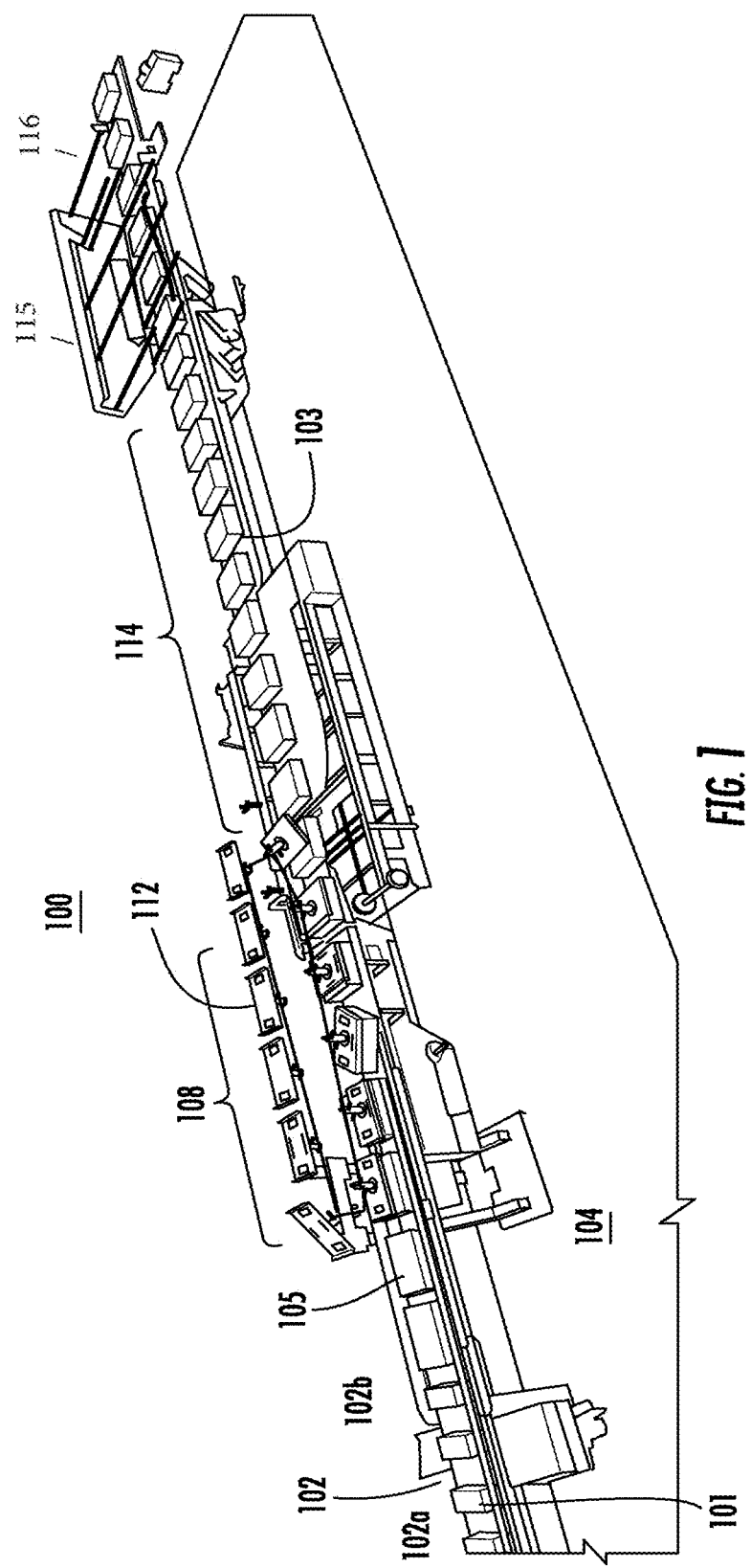
FIG. 1 is a perspective view of an overall packaging and spacing system.

Reference will now be made to the drawings with like reference numerals identifying similar structural features or aspects of the subject invention. For purposes of explanation and illustration, and not limitation, a partial view of an exemplary embodiment of a conveyor system in accordance with embodiments of the invention is shown in FIG. 1 and is designated generally by reference character 100. Other views of the system in accordance with embodiments of the invention, or aspects thereof, are provided in FIGS. 2-4, as will be described below. The methods and systems of the invention may be used to group, rotate, and reorient groups of packages at once instead of rotating each package individually. Each of the packages may comprise a plurality of articles or the like.

FIG. 1 shows a system 100 for taking a single stream 101 of packages, grouping packages, reorienting the groups by approximately 90 degrees and splitting the groups up again so as to form three parallel streams 103 of packages wherein the packages in each of the latter three streams 103 includes packages oriented at 90 degrees to the original single stream 101. The system 100 includes a first conveyor 102 to drive a single stream 101 of packages from a first end 102a to a second end 102b. The first conveyor 102 moves the single stream 101 at a first speed. Each of the packages of the single stream 101 are spaced apart from each other. When the single stream 101 reaches the second end 102b of the first conveyor 102, the packages may be slowed down, thus eliminating the spacing between each of the packages. For example, as a leading package 101a slows down or stops in the actuation section 104, a trailing package 101b catches up to it, and the gap between the two is decreased thereby forming groups of packages 105. Additionally, the groups of packages 105 may be further formed by lugs 106 engaging with one or more of the packages and moving the packages into contact with each other, or close proximity with each other, to form the groups of packages 105. Alternatively, individual packages may be grouped together by other pushing or guidance mechanisms that push or guide the packages together to form respective groups of packages 105. As another example, the packages may be grouped together via a restraining mechanism that restrains or slows movement of one or more of the packages so that the packages are moved together to form the respective groups of packages 105. Other grouping mechanisms and processes will be apparent to those skilled in the art and may be used to orient the individual packages into groups of packages 105.

Figure 2:
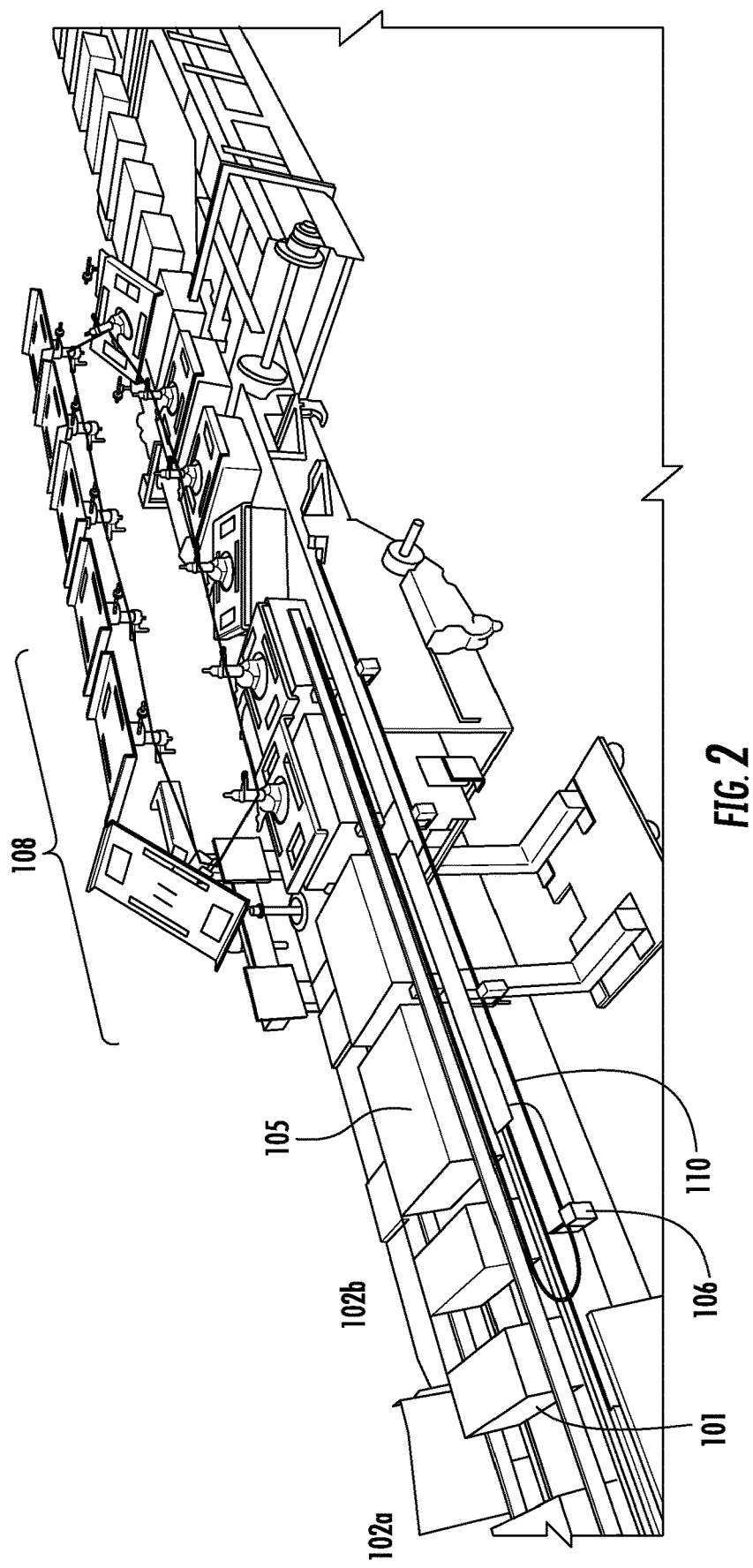
FIG. 2 is a perspective view of the grouping section of FIG. 1, showing individual packages being grouped together and each of the groups rotated.

FIG. 2 shows a closer view of the actuation section 104. The actuation section 104 is situated at the second end 102b of the first conveyor 102. Lugs 106 actuate forward the newly formed groups of packages 105 to an orienting section 108 at a predefined second speed. The lugs 106 may be provided on a driven chain or chains or other suitable moving or driving mechanisms, as will be readily apparent to those skilled in the art. In the actuation section 104, a belt may be moving the groups of packages 105 forward in tandem with the lugs 106. The lugs 106 circulate adjacent to the actuation section 104 to move forward certain predetermined packages in the stream. For example, the lugs 106 may contact the back of every third package or every other package in order to propel it and the package, or packages, ahead of it forward. Alternatively, the lugs 106 may contact the back of a different predetermined number interval of the packages to propel it and the packages ahead of it forward.

FIG. 2 further shows each lug 106 mounted upon and following a path of a track 110. The track 110 may be a driven chain or other suitable mechanical means for moving and actuating the lugs 106 along the direction of the conveyor. Each of the lugs 106 is individually controllable such that while actuating the alternating packages, the lugs 106 may accelerate to increase in speed while one or more other lugs 106 travels at a different speed around the track 110 when moving away from the groups of packages 105. This allows the lugs 106 to adapt to the pace of the single stream 101, the size of each individual package, and the desired size of each group of packages 105. Each of the lugs 106 passes over the actuation section 104. The lugs 106 may hang over portions of the actuation section 104 when the lugs 106 are actuating the packages forward. The track 110 allows each of the lugs 106 to contact the packages prior to the orienting section 108 and is configured to move each of the lugs 106 away from the packages within the orienting section 108.

Figure 3:
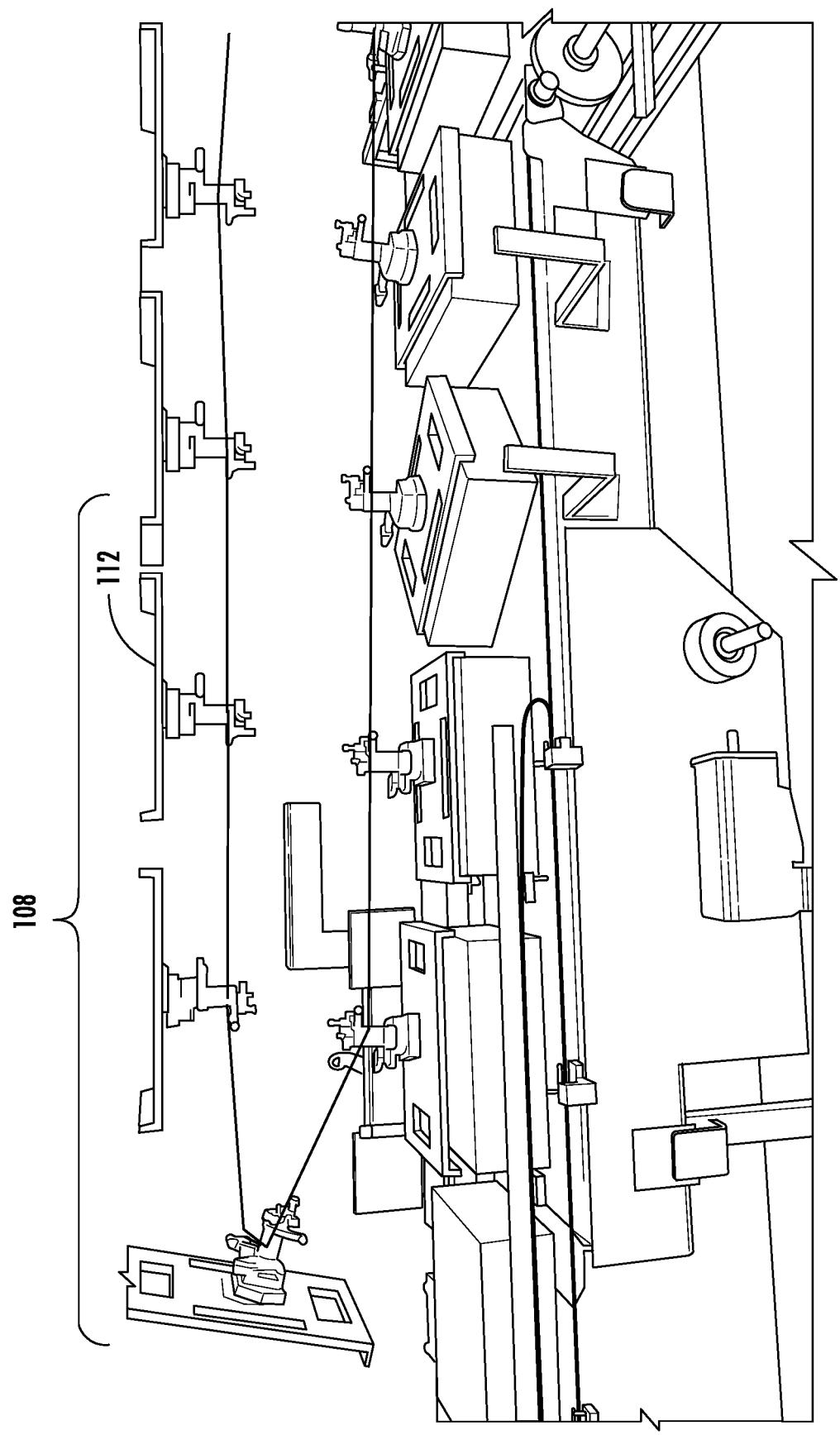
FIG. 3 is a side view of the grouping and orienting sections of FIG. 1.

FIG. 3 shows an orienting section 108 located downstream of the actuation section 104. The orienting section 108 includes a plurality of chain driven rotator mechanisms 112. Each of the rotator mechanisms 112 is configured to grip and rotate a group of packages by 90 degrees. The rotator mechanisms 112 grip each group of packages from the top, and at a certain point, the rotator mechanism is forced to rotate by its chain drive, and thus slidingly turns the groups of packages, reorienting them by 90 degrees, and afterwards releasing the grip.

The system 100 provides for conveying a single stream 101 of packages, grouping those packages into groups of a predetermined number, reorienting or rotating the groups by 90 degrees, and splitting up the packages in the groups of packages so as to form three parallel streams 103 of packages. This allows the system to have a shorter uptime or greater throughput rate, and requires fewer rotator mechanisms to handle the same number of packages, rather than turning each package of the single stream 101 individually.

Figure 4:
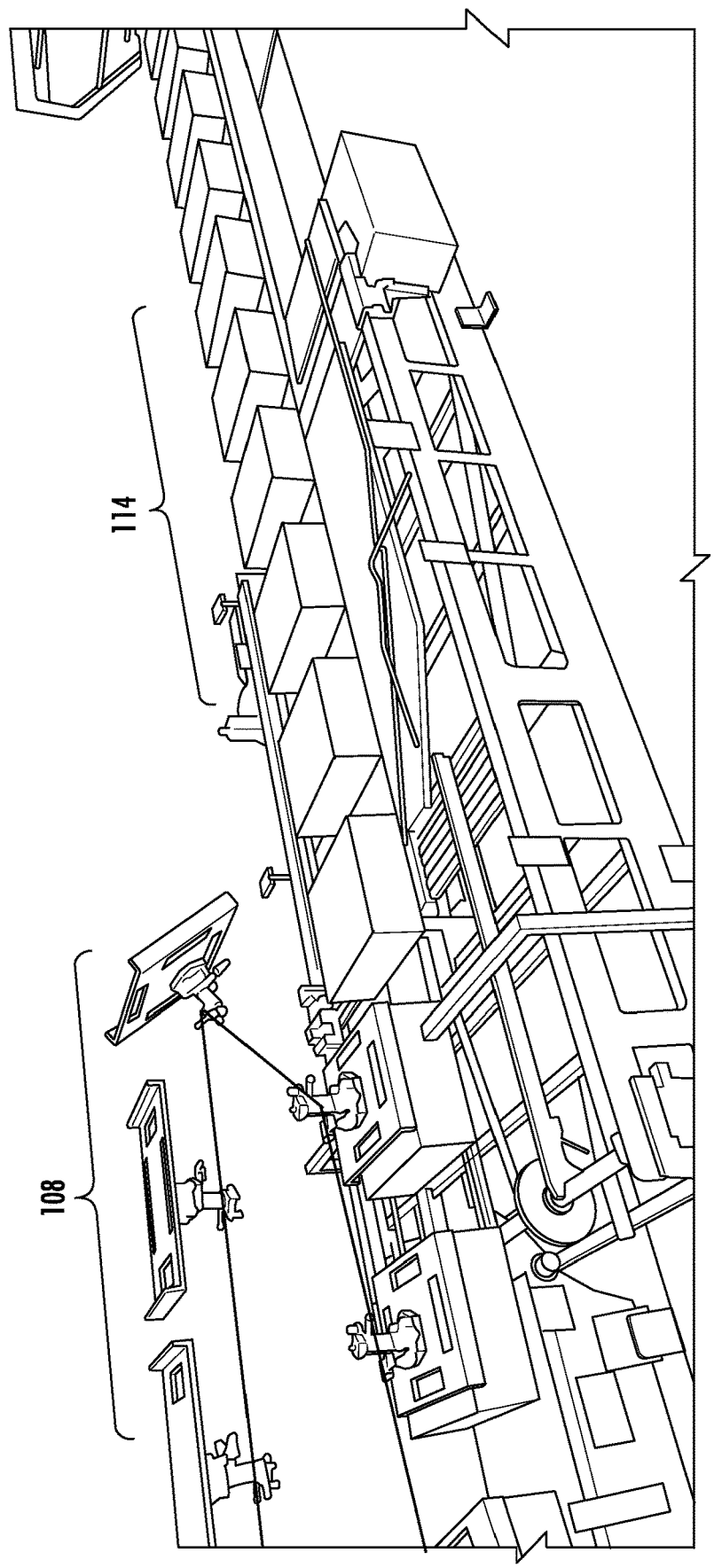
FIG. 4 is perspective view of the end of the orienting section of FIG. 1 and the second conveyor section.

FIG. 1 and FIG. 4 shows a second conveyor section 114 located downstream of the orienting section 108. A splitting section 115 located adjacent to or downstream of the second conveyor section 114, which may be used to split the groups of packages into parallel streams of individual packages and then convey the packages to subsequent packaging or labeling processes. In one embodiment, the groups of packages 105 may be split apart or divided into the streams of individual packages by, for example, a slat divider 116 provided in the splitting section 115. The slat divider 116 creates a separation or gap in between each package in the group of packages, thereby forming the parallel streams of individual packages.

The methods and systems of the present disclosure, as described above and shown in the drawings, provide for an orienting system with superior properties including increased reliability and stability, and reduced size, weight, complexity, and/or cost. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A system for orienting packages, comprising: a first conveyor configured to drive a stream of packages from a first end to a second end at a predefined first speed; an actuation section situated at the second end of the first conveyor configured to receive the stream of packages from the first conveyor and actuate the stream of packages to an orienting section at a predefined second speed, wherein the second speed is less than the first speed; and a plurality of lugs adjacent to the actuation section configured to actuate forward packages in the stream of packages forming groups of two or more packages.

2. The system of claim 1, wherein each of the plurality of lugs is mounted upon, and follows a path of a fixed track.

3. The system of claim 2, wherein each of the lugs are individually controllable such that at least one of the lugs serves to increase the speed of one or more of the packages while actuating the one or more packages whilst one or more other lugs travels at a different speed than the at least one of the lugs.

4. The system of claim 2, wherein each of the lugs is configured to actuate every other or every third package of the stream of packages.

5. The system of claim 1, further comprising an orienting section located downstream of the actuation section comprising a plurality of chain driven rotator mechanisms configured to rotate the groups of packages.

6. The system of claim 5, wherein each of the plurality of lugs is mounted upon, and follows a path of a track, the track being configured to drive each of the lugs to contact the packages prior to the orienting section and configured to drive each of the lugs away from the packages within the orienting section.

7. The system of claim 5, wherein each of the rotator mechanisms is configured to rotate one of the groups of packages by approximately 90 degrees.

8. The system of claim 5, further comprising a second conveyor section downstream of the orienting section, the second conveyor section configured to receive and convey the groups of packages.

9. The system of claim 8, further comprising a splitting section located adjacent to, or downstream of, the second conveyor, the splitting section comprising one or more dividers configured to separate packages in each of the groups of packages.

10. The system of claim 1, wherein each of the lugs passes over the actuation section.

11. A method for orienting packages, comprising: driving a stream of packages by a first conveyor at a predefined first speed, wherein each of the packages are spaced apart from each other; forming groups of packages by driving one or more packages in the stream of packages at a predefined second speed different from the predefined first speed, the groups of packages being spaced apart from each other and comprising two or more packages; and rotating each of the groups of packages by approximately 90 degrees.

12. The method of claim 11, wherein driving one or more packages in the stream of packages comprises driving every second or every third package in the stream of packages by a lug to form the groups of packages.

13. The method of claim 11, further comprising slowing each of packages of the stream of packages downstream of the first conveyor.

14. The method of claim 11, further comprising: driving each of the groups of packages by a second conveyor; and splitting each of the previously formed groups of packages into individual streams of packages.

15. The method of claim 14, wherein splitting each of the previously formed groups of packages comprises: separating packages in each of the groups of packages with a divider to create a space between each of the packages in each of the groups of packages.

16. The method of claim 11, wherein rotating each of the groups of packages comprises: engaging a plurality of chain driven rotator mechanisms with the groups of packages, each of the rotator mechanisms configured to rotate a respective one of the groups of packages.

* * * * *